United States Patent [19]
Watanabe

[11] 4,335,528
[45] Jun. 22, 1982

[54] SPORT SHOES

[75] Inventor: Morio Watanabe, Sakai, Japan

[73] Assignee: Daicel Chemical Industries, Ltd., Osaka, Japan

[21] Appl. No.: 120,952

[22] Filed: Feb. 12, 1980

[30] Foreign Application Priority Data

Oct. 10, 1978 [JP] Japan ................................ 53-144440
Jul. 30, 1979 [JP] Japan .................................. 54-97905

[51] Int. Cl.³ ...................... A43B 13/12; A43C 13/08; A43B 5/00
[52] U.S. Cl. ..................................... 36/30 R; 36/14; 36/127; 12/142 RS
[58] Field of Search ............ 36/30 R, 14, 32 R, 59 R, 36/127; 12/142 RS; 264/244; 428/475.8, 476.3, 476.9, 473, 904

[56] References Cited
U.S. PATENT DOCUMENTS

| | | | |
|---|---|---|---|
| 2,323,562 | 7/1943 | Nugent | 36/30 R |
| 2,350,852 | 6/1944 | Wehr | 36/DIG. 2 |
| 3,693,269 | 9/1972 | Guarrera | 36/30 R |
| 3,812,604 | 5/1974 | Sato | 36/14 |
| 4,245,406 | 1/1981 | Landay et al. | 36/30 R |

FOREIGN PATENT DOCUMENTS

| | | | |
|---|---|---|---|
| 2504157 | 5/1976 | Fed. Rep. of Germany | 36/30 R |
| 2805426 | 8/1979 | Fed. Rep. of Germany | 36/32 R |
| 1091098 | 11/1967 | United Kingdom | 36/30 R |
| 1536901 | 12/1978 | United Kingdom | 36/14 |

*Primary Examiner*—James Kee Chi
*Attorney, Agent, or Firm*—Blanchard, Flynn, Thiel, Boutell & Tanis

[57] ABSTRACT

A sport shoe in which the shoe sole is bonded to an insert layer during the formation of the shoe sole by injection-molding and the assembly of the shoe sole and the insert layer is secured to the shoe upper by an adhesive applied between the insert layer and the shoe upper.

5 Claims, 4 Drawing Figures

SPORT SHOES

BACKGROUND OF THE INVENTION

1. Field of the Invention

The present invention relates to sport shoes (athletic shoes). More particularly, the invention relates to sport shoes in which a sole composed of a synthetic resin can easily be bonded to a shoe upper composed of natural or artificial leather and, as a result, the steps of manufacturing the shoe can be simplified.

2. Description of the Prior Art

The soles of sport shoes for use in playing soccer, football, baseball, golf, other athletic sports and the like, are commonly made of synthetic resins such as polyvinyl chloride resins, ethylenevinyl acetate copolymer resins, polyamide resins, polyurethane resins and polycarbonate resins, instead of the leather and rubber soles that were used in the past, because the synthetic resins have excellent properties such as a low specific gravity, a low water-absorbing property, good durability and high resistance to wear and abrasion.

However, soles made of those synthetic resins do not bond to a shoe upper composed of leather sufficiently strongly and they are inferior to conventional shoe soles made of leather or rubber in this point. Accordingly, peeling often occurs between the synthetic resin sole and the shoe upper during use. Although polyamide resins are most preferred for making the soles of sport shoes because they are lightweight and tough and a good fixation thereof to the female, internally threaded, receivers of calk or spike assemblies can be obtained, they are especially poor in the bondability thereof to a shoe upper composed of natural or artificial leather and there is not available an adhesive that provides completely effective bonding. Therefore, the bond between a polyamide resin shoe sole and a leather shoe upper is usually reinforced by nailing or sewing at the present. However, the appearance of the shoe is adversely affected by using such reinforcements, the time required for making the shoes is lengthened and the manufacturing process is complicated because of the need to perform such reinforcing steps.

SUMMARY OF THE INVENTION

It is a primary object of the present invention to eliminate the above-mentioned defect of insufficient bonding involved in the use of shoe soles made of synthetic resins.

More specifically, according to the present invention, an insert material, having a good bondability to a shoe upper composed of leather, is inserted in advance into a shoe sole mold, and then the shoe sole is made by injection-molding a synthetic resin using said mold and thereby during the molding step the insert material is integrated with the synthetic resin shoe sole. Complete bonding of the thus-prepared, integral assembly of the insert material and the synthetic resin sole to the shoe upper composed of leather can easily be obtained during the subsequent bonding step and a reinforcing post-treatment such as nailing or sewing can be omitted.

Figure 1:
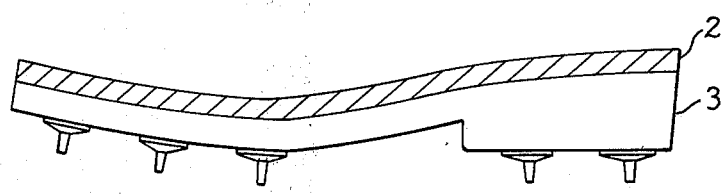
FIG. 1 is a side view illustrating a synthetic resin shoe sole and an insert material that are used in the present invention.

In the drawings, reference numerals 1, 2, 3, 4 and 5 identify, respectively, a natural or artificial leather shoe upper, an insert material, a synthetic resin layer (plastic shoe sole), an adhesive for bonding the assembly of the insert material and the plastic shoe sole to the upper and a film of hot-melt adhesive for bonding the insert material to the plastic shoe sole.

DETAILED DESCRIPTION OF THE PREFERRED EMBODIMENTS

The insert material 2, used in the present invention, can be made of any material which does not undergo thermal deformation or thermal deterioration at the injection molding temperature which is used to make the shoe sole 3 and which material has a good bondability to the shoe upper 1 composed of natural or artificial leather. For example, the insert material 2 can be made of natural leather, artificial leathers such as Kuralino (trademark) and Cordolay (trademark), rubbers, non-woven fabrics, felts and fibers.

The thickness of the insert material 2 can be freely changed according to the kind of the sport shoe being made and the feel and appearance desired for the finished sport shoe.

As the synthetic resin that is used to make the shoe sole 3 in the present invention, there can be mentioned, for example, polyvinyl chloride, polyethylene, polypropylene, polyacetal resins, polycarbonates, polyamides, acrylic resins, polystyrene and polyurethanes.

Polyamides such as nylon-11 and nylon-12 are especially preferred as the material for making the sole 3 of the sport shoe, according to the present invention, because they are lightweight and tough and a good fixation can be attained to the female internally threaded receivers of the calk or spike assemblies.

A sufficiently strong bonding of the synthetic resin of the sole 3 to the insert material 2 can ordinarily be obtained at the temperature and pressure employed for the injection molding, but if the bonding force is insufficient, a film 5 of hot melt adhesive can be applied to one surface (the surface to be bonded to the synthetic resin) of the insert material 2 and, after drying, the shoe sole injection molding operation is carried out, whereby complete bonding can be obtained.

The adhesive is selected taking into account the particular combination of materials used to make the synthetic resin of the shoe sole 3 and the insert material 2. In the present invention, the insert material 2 is employed for facilitating the subsequent step of bonding the shoe sole 3 to the leather shoe upper 1 and for obtaining complete bonding. Furthermore, in the case where a fashionable appearance is required, as in case of gold shoes, the insert material 2 can be used as a piece sole by forming seams on the peripheral portion of the insert material 2 which is cut in a shoe-like shape.

If desired, mass production of such insert materials 2 can be accomplished very easily by roll-coating an adhesive on one surface of a starting sheet, drying the applied adhesive and cutting the sheet into the shape of a shoe.

It is preferred that the sheet may be cut off, in advance, along a cavity surrounded by the thickness-increasing edge part of the heel portion. Good results are obtained if the adhesive is applied along a width of 7 mm. In the preparation of the injection mold, sharp needle projections can be formed on the mold surface on which the insert material 2 is placed so that such projections penetrate into and prevent movement of the insert material during the injection molding step.

Either a solution-type adhesive or a film-type adhesive can be used as the adhesive 4 in the present invention. A hot-melt adhesive described in detail hereinafter is preferred as the film-type adhesive.

In accordance with one preferred embodiment of the present invention, there is provided an improvement characterized in that, in order to make the bonding between the insert material and plastic sole stronger, a film 5 of hot-melt adhesive is bonded to one surface of the insert material 2, the insert material 2 is then inserted into the mold and the plastic sole 3 is formed by injection molding and is completely bonded to the insert material 2 by means of the hot-melt adhesive film wherein the heat applied in the molding step is utilized to melt the adhesive.

Bonding of the film 5 of hot-melt adhesive to the insert material 2 can easily be accomplished by laminating the film of hot-melt adhesive on one surface of a starting sheet used for preparing the insert material. The hot-melt adhesive-coated starting sheet is cut to a shoe sole shape corresponding to the shape and size of the shoe sole mold. According to this procedure, mass production can be performed very easily.

Thermoplastic resins such as polyethylene, ethylene-vinyl acetate copolymer resins (EVA) and polyamide resins can be used as the hot-melt adhesive in the present invention. An appropriate hot-melt adhesive is selected, taking into consideration the kind of the synthetic resin used to make the sole 3 and the material of which the insert material 2 is made so that the hot-melt adhesive can be bonded under heating to both the plastic sole 3 and the insert material 2.

The thickness of the film 5 of hot-melt adhesive can be a minimum thickness capable of bonding the plastic sole 3 completely to the insert material 2. More specifically, it is preferred that the thickness of the film 5 of hot-melt adhesive be from 20 to 500 microns, especially from 50 to 200 microns.

It is preferred that the melting point of the hot-melt adhesive be at least 10° C. lower than the melting point of the synthetic resin used to make the shoe sole. A hot-melt adhesive having a melting point of 100° to 160° C. is ordinarily used.

When the film 5 of hot-melt adhesive is interposed between the plastic sole 3 and the insert material 2 according to this embodiment of the present invention, the hot-melt adhesive penetrates into the interstices between the fibers of the artificial leather or the like of the insert because of the heat and pressure applied during the injection molding step, and an effect of increasing the bonding strength can be attained in addition to the effect of heat-bonding the plastic shoe sole to the insert material.

One embodiment of the present invention will now be described with reference to FIGS. 1 and 2.

A shoe sole made of nylon-12 for a gold shoe is first formed by injection molding in the following way.

A liquid adhesive composition comprising a polyurethane adhesive and a curing agent therefor, mixed at a ratio of 100:8 parts by weight, is roll-coated and then dried on one surface of an artificial leather having a thickness of 2 mm. The adhesive-coated artificial leather is cut in the shape of a shoe sole whereby to form an insert material 2 (a portion corresponding to a cavity in the heel portion of the sole is cut out). The insert material 2 is placed on the lower surface of a mold for injection molding so that the adhesive-coated surface of the insert material faces upwardly. Sharp needles project upwardly from the lower surface of the mold to prevent movement of the insert material 2 during the injection molding.

Calk or spike assemblies for golf shoes, or the female internally threaded receivers for golf shoe calks or spikes are mounted on the upper surface of the mold and then the mold is closed. Molten nylon-12 is then injected into the mold to form a synthetic resin sole comprising the insert material 2 and the nylon-12 layer 3, which are heat-bonded together. An injection molding machine Model TNS-100 manufactured by Nissei Zyushi K.K. is used for the above-mentioned injection molding. The synthetic resin sole is removed from the injection mold.

Figure 2:
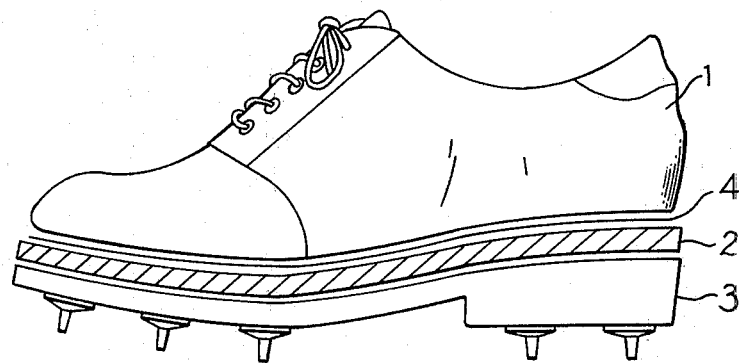
FIG. 2 is an exploded side view showing the parts of a sport shoe according to the present invention.

Then, the lower portion and the insole of a shoe upper 1 for a golf shoe, which has been made from an artificial leather in advance, are bonded to the surface of the insert material 2 (artificial leather), which surface is remote from the nylon-12 sole 3 obtained by the injection molding, by using an adhesive 4 for artificial leather of any suitable conventional type whereby to obtain a golf shoe as shown in FIG. 2.

In the golf shoe of the present invention, prepared by the above-described procedure, the bonding strength between the nylon-12 resin layer 3 as the sole and the insert material 2 (artificial leather) is higher than 8.8 Kg/in (peeled at 180° C.) at which the insert material is fractured.

Another embodiment of the present invention made using a film of hot-melt adhesive will now be described with reference to FIGS. 3 and 4.

An artificial leather having a white gloss on one surface (Cordolay manufactured by Teijin and having a thickness of 1 mm) is used as the insert material 2, and a film 5 of hot-melt adhesive having a thickness of 150 $\mu$, which is composed of nylon 6/612/12 copolymer (having a melting point of 120° C.) is hot-laminated on the gloss-free back surface of the artificial leather whereby to form a starting sheet for obtaining the insert material. The starting sheet is cut to a size corresponding to the size of a mold for molding a sole of a sport shoe whereby to form an insert material 2 having a film 5 of hot-melt adhesive hot-laminated thereon.

In the case where a release paper is applied to the film 5 of hot-melt adhesive, after cutting out the insert material 2 from the starting sheet, the release paper is peeled off.

The thus-obtained insert material 2 is inserted in one part of a mold for molding a golf shoe sole and then nylon-12 (Diamide L-2121-S manufactured by Daicel, Ltd.) is injection molded therein to form a plastic sole 3 on the surface of the insert material 2 to which the nylon 6/612/12 film has been hot-laminated by using an injection molding machine Model TNS-100 manufactured by Nissei Zyushi.

Incidentally, the calk or spike assemblies for the golf shoe, or at least the female, internally threaded portion of such assemblies, are inserted in the other part of the mold prior to the injection molding operation.

Figure 3:
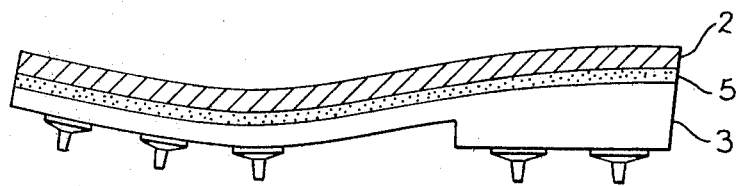
FIG. 3 is a side view illustrating an assembly of an insert material and a plastic sole prepared by using a film of hot-melt adhesive according to the present invention.

During the molding and solidification, the insert material 2 and plastic sole 3 are completely heat-bonded to each other through the film 5 of hot-melt adhesive as shown in FIG. 3.

Figure 4:
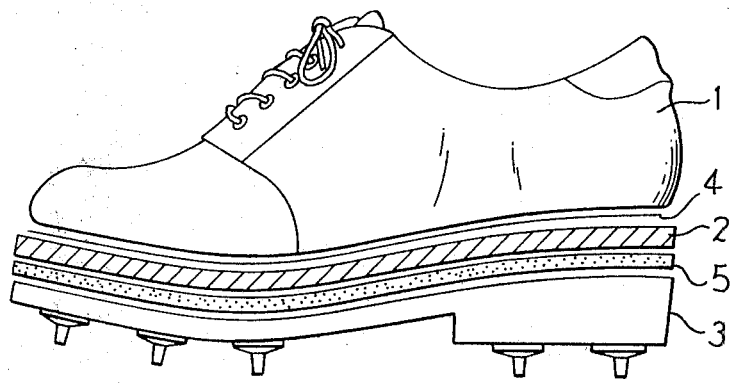
FIG. 4 is an exploded side view illustrating the parts of a golf shoe comprising the assembly shown in FIG. 3.

The thus-prepared plastic sole provided with the integral insert material can easily be bonded to a leather shoe upper 1 by using an inexpensive neoprene-type adhesive 4, as shown in FIG. 4.

In the inside portion of the thus-formed shoe, the white gloss surface of Cordolay acts as the sole piece.

Since the heat-fusion-bonded interface between the plastic sole 3 and insert material 2 is excellent in water resistance, peeling does not occur during use.

The bonding strength between the heat-bonded insert material 2 and plastic sole 3 is higher than 8 Kg/in (peeled at 180° C.) at which the insert material is fractured.

In the foregoing embodiments, molding of golf shoes has been described. However, the present invention can be applied to other sport shoes, for example, baseball shoes and soccer shoes.

The embodiments of the invention in which an exclusive property or privilege is claimed are defined as follows:

1. A sport shoe comprising a shoe sole and a shoe upper composed of natural or artificial leather, said shoe sole being an integral laminate of an insert material layer the lower surface of which is bonded to an injection-molded synthetic resin layer to form said integral laminate, said synthetic resin being selected from the group consisting of nylon-11 and nylon-12, said insert material layer being made of a material which has a good bondability to the shoe upper and which does not undergo thermal deformation at the injection-molding temperature and pressure, said material being selected from the group consisting of natural leather, artificial leather, rubber, nonwoven fabric, felts and fibers, the upper surface of said insert material layer being bonded to the lower portion and insole of said shoe upper by an adhesive, said shoe sole having been prepared by placing into an injection mold a preformed insert material layer and then injection-molding said synthetic resin into said mold to form a monolithic synthetic resin layer and to heat-bond the lower surface of the insert material layer to the upper surface of the synthetic resin layer formed by the injection-molding.

2. A sport shoe according to claim 1 in which said insert material layer is directly bonded to said synthetic resin layer without the use of a separately applied adhesive.

3. A sport shoe according to claim 1 in which the lower surface of said insert material is coated with a film of hot-melt adhesive prior to placing same in the injection mold so that said adhesive is melted during said injection-molding to bond together said insert material layer and said synthetic resin layer.

4. A sport shoe according to claim 3 in which said film of hot-melt adhesive has a thickness of from 20 to 500 microns and has a melting point of from 100° to 160° C.

5. A sport shoe sole comprising an insert material layer made of a material having a good bondability to a shoe upper composed of natural or artificial leather and which does not undergo thermal deformation at an injection-molding temperature and pressure, said material being made of a material selected from the group consisting of natural leather, artificial leather, rubber, nonwoven fabric, felts and fibers, and an injection-molded synthetic resin layer united to one surface of said insert material layer and integral therewith, said synthetic resin being selected from the group consisting of nylon-11 or nylon-12, said sport shoe sole having been prepared by bonding a film of hot-melt adhesive to said one surface of said insert material layer, inserting said insert material layer in an injection mold and injection said synthetic resin, in a molten state, onto said one surface of said insert material layer to form a monolithic injection-molded synthetic resin layer and to completely heat-bond said insert material layer to said synthetic resin layer formed by injection-molding through said film of hot-melt adhesive.

* * * * *

UNITED STATES PATENT AND TRADEMARK OFFICE
CERTIFICATE OF CORRECTION

PATENT NO. : 4 335 528

DATED : June 22, 1982

INVENTOR(S) : Morio Watanabe

It is certified that error appears in the above—identified patent and that said Letters Patent is hereby corrected as shown below:

On the Title page,

Item [22]; change to read as follows:

---Filed: Feb. 13, 1980---.

Item [30]; delete "Oct. 10, 1978 [JP] Japan.... 53-144440".

Column 6, line 35; change "tion" to ---ting---.

Signed and Sealed this

Fifth Day of October 1982

[SEAL]

Attest:

GERALD J. MOSSINGHOFF

Attesting Officer    Commissioner of Patents and Trademarks